(12) United States Patent
Uhlenbrock et al.

(10) Patent No.: US 11,207,987 B2
(45) Date of Patent: Dec. 28, 2021

(54) CHARGING ARRANGEMENT FOR AN ELECTRIC VEHICLE AND METHOD FOR OPERATING THE CHARGING ARRANGEMENT

(71) Applicant: SCIENLAB BETEILIGUNGSGESELLSCHAFT MBH, Bochum (DE)

(72) Inventors: Roger Uhlenbrock, Witten (DE); Michael Schugt, Herne (DE); Peter Muss, Bochum (DE); Christoph Dörlemann, Recklinghausen (DE)

(73) Assignee: SCIENLAB BETEILIGUNGSGESELLSCHAFT mbH, Bochum (DE)

( * ) Notice: Subject to any disclaimer, the term of this patent is extended or adjusted under 35 U.S.C. 154(b) by 0 days.

(21) Appl. No.: 16/628,869

(22) PCT Filed: Jul. 6, 2018

(86) PCT No.: PCT/DE2018/100623
§ 371 (c)(1),
(2) Date: Jan. 6, 2020

(87) PCT Pub. No.: WO2019/007466
PCT Pub. Date: Jan. 10, 2019

(65) Prior Publication Data
US 2020/0223319 A1 Jul. 16, 2020

(30) Foreign Application Priority Data
Jul. 7, 2017 (DE) .................. 20 2017 104 168.9

(51) Int. Cl.
*B60L 53/10* (2019.01)
*B60L 53/62* (2019.01)
(Continued)

(52) U.S. Cl.
CPC .............. *B60L 53/11* (2019.02); *B60L 53/16* (2019.02); *B60L 53/18* (2019.02); *B60L 53/305* (2019.02);
(Continued)

(58) Field of Classification Search
CPC .......... B60L 53/11; B60L 53/16; B60L 53/18; B60L 53/62; B60L 53/66; B60L 53/68;
(Continued)

(56) References Cited

U.S. PATENT DOCUMENTS

| 9,387,767 B2 * | 7/2016 | Ishii | B60L 53/16 |
| 2014/0002023 A1 * | 1/2014 | Ichikawa | B60L 53/11 |
| | | | 320/109 |

(Continued)

FOREIGN PATENT DOCUMENTS

| DE | 10 2009 045 639 | 4/2011 |
| DE | 10 2010 045 131 | 3/2012 |

(Continued)

OTHER PUBLICATIONS

International Search Report for PCT/DE2018/100623 dated Oct. 23, 2018, 5 pages.

(Continued)

*Primary Examiner* — Paul Dinh
(74) *Attorney, Agent, or Firm* — Nixon & Vanderhye P.C.

(57) ABSTRACT

A charging arrangement for an electric vehicle having a traction battery is disclosed having a power supply station connected to a power network and a power supply cable with charging plug. In order to perform a charging process, the charging plug is connected to the electric vehicle in which a voltage converter is arranged in the charging plug to convert the supply voltage $U_V$ into a charging voltage $U_L$, which is lower relative thereto, and a method for operating the charging arrangement.

19 Claims, 5 Drawing Sheets

(51) Int. Cl.
*B60L 53/66* (2019.01)
*B60L 53/30* (2019.01)
*B60L 53/16* (2019.01)
*B60L 53/18* (2019.01)
*H02J 7/00* (2006.01)

(52) U.S. Cl.
CPC ............ *B60L 53/62* (2019.02); *B60L 53/66* (2019.02); *H02J 7/00032* (2020.01); *H02J 7/0042* (2013.01); *H02J 7/0047* (2013.01); B60L 2210/12 (2013.01); *H02J 2207/20* (2020.01)

(58) Field of Classification Search
CPC .. B60L 53/305; B60L 2210/12; H02J 7/0042; H02J 7/0047; H02J 7/00032; H02J 2207/20; Y02T 90/168; Y02T 90/167; Y02T 90/12; Y02T 90/14; Y02T 10/70; Y02T 10/7072; Y02T 10/72; Y04S 30/12
USPC ......................................................... 320/109
See application file for complete search history.

(56) References Cited

U.S. PATENT DOCUMENTS

| | | |
|---|---|---|
| 2015/0224890 A1 | 8/2015 | Kim et al. |
| 2015/0357834 A1 | 12/2015 | Mclean et al. |
| 2016/0036256 A1 | 2/2016 | Sukup et al. |
| 2016/0272075 A1 | 9/2016 | Biagini et al. |

FOREIGN PATENT DOCUMENTS

| | | |
|---|---|---|
| DE | 10 2011 079 870 | 1/2013 |
| DE | 10 2014 004 790 | 10/2015 |
| EP | 2 875 985 | 5/2015 |
| JP | 2016-096648 | 5/2016 |
| WO | 2011/151844 | 12/2011 |
| WO | 2013/180324 | 12/2013 |

OTHER PUBLICATIONS

German Written Opinion of the ISA for PCT/DE2018/100623 dated Oct. 23, 2018, 8 pages.
English German Office Action for DE102017115284.9 dated Jan. 29, 2018, 6 pages.

* cited by examiner

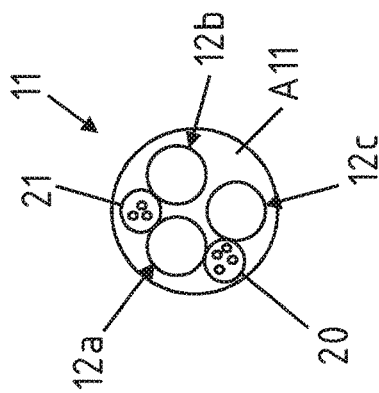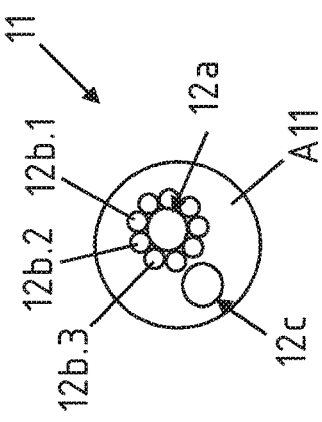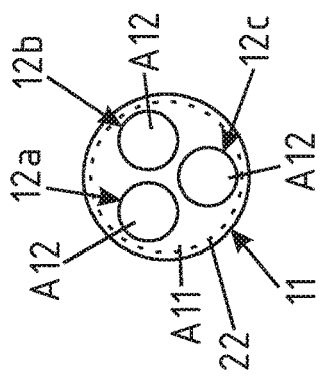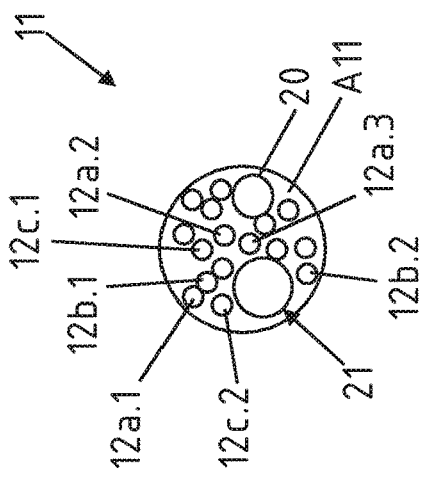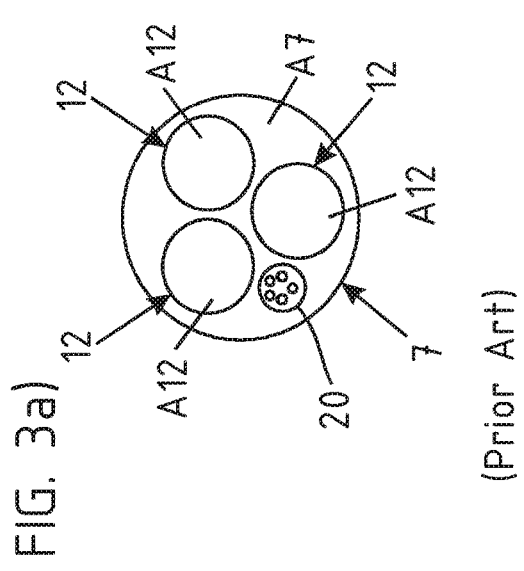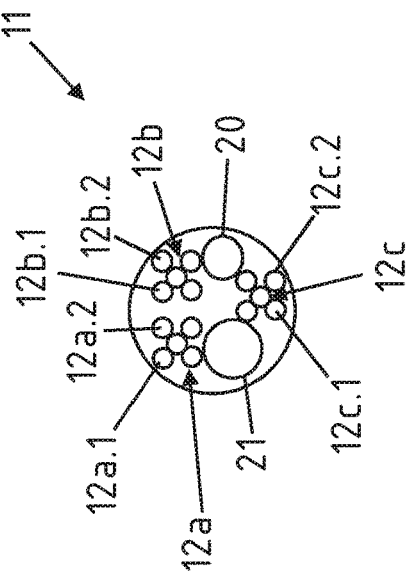
FIG. 3a) (Prior Art)
FIG. 3b)
FIG. 3c)
FIG. 3d)
FIG. 3e)
FIG. 3f)

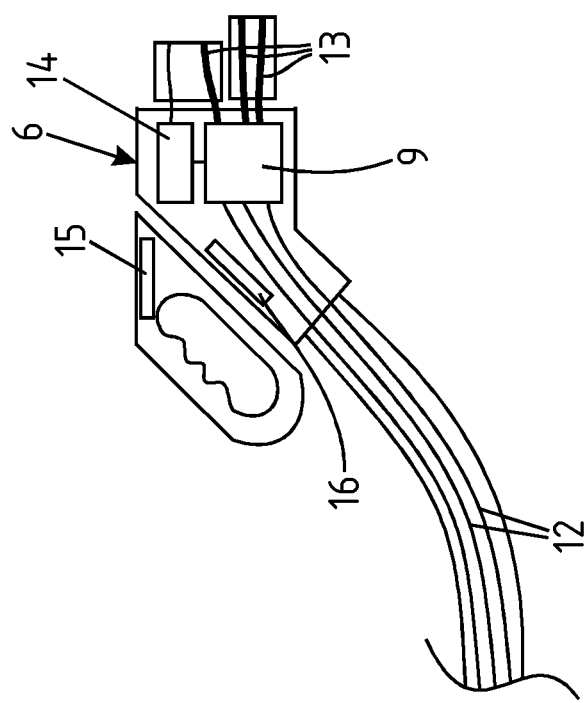

CHARGING ARRANGEMENT FOR AN ELECTRIC VEHICLE AND METHOD FOR OPERATING THE CHARGING ARRANGEMENT

CROSS REFERENCE TO RELATED APPLICATIONS

The present application is a National Phase of International Application Number PCT/DE2018/100623 filed Jul. 6, 2018, which designated the U.S. and claims priority benefits from German Patent Application Number No. DE 20 2017 104 168.9 filed Jul. 7, 2017.

BACKGROUND

1. Field of the Invention

The present invention relates to a charging arrangement for an electric vehicle according to the features in the preamble of claim 1.

The present invention further relates to a method for operating the charging arrangement according to the features in the preamble of claim 15.

2. Description of the Related Art

For the electrical driving of an electric or hybrid vehicle, it is necessary for the battery, hereinafter also referred to as traction battery, of the vehicle to be charged via an external energy source. The energy is supplied via a plug-in system with a charging cable, by means of which the external energy source is connected to the vehicle and the charging process can take place.

In order to achieve a standard, the charging process is defined in various standards (e.g. IEC 61851, DIN SPEC 70121 and ISO 15118). In principle, a distinction is made between an "AC charge" and a "DC charge". In the case of the AC charge, the electric vehicle is connected using the charging cable directly to a domestic outlet (single-phase or three-phase). The transmissible capacities are limited to 22 kW.

In order to realize higher charging capacities, the so-called DC charging technology is used. Here, a DC voltage is generated by an external charging device, said DC voltage being connected using the charging cable to the vehicle and within directly to the battery. In this way, charging capacities of up to 50 kW can be achieved nowadays.

If one considers the objectives of the automotive industry, the ranges of an electric vehicle will rise from 150 km currently to 500 km or more. In addition, it is required that the current charging time of up to several hours should be reduced to a few minutes. This is only possible when the battery charging current rises to several hundred amperes (instead of the current 50 A). The charging cables between the charging column and the electric vehicle are problematic here. According to the standard DIN VDE 0298, the cable cross-sections must be designed according to the maximum current.

Different methods (PWM, PLC) are used for data communication between the electric vehicle and the charging column. However, the communication always runs in a cable-bound manner via additional insulated communication lines located in the charging cable.

These additional communication lines naturally also increase the weight and the production costs of a charging cable.

Charging cables with integrated water cooling are proposed for solving the weight problem. Although the cross-sections and thus the copper weight can be saved, the water cooling is very complicated and likewise expensive to manufacture and maintain.

In addition, there is often no water connection at the charging column points, so that this must either be provided separately or a water cooling system with a heat exchanger must be installed in the charging column. Both solutions considerably increase the procurement costs. In addition, the maintenance of the column and of the charging cable is very complicated and expensive due to the water cooling.

By reducing the cable cross-section, the electrical resistance of the charging cable becomes greater, which increases the power loss. These losses impair the efficiency and increase the costs for the electrical charge for which the user and/or the operator must pay.

A charging arrangement is known from DE 10 2014 004 790 A1, for example, in which two energy storage elements are connected in series within a motor vehicle in order to increase the possible charging voltage.

SUMMARY

The aim of the invention is to provide a possibility of increasing the charging power for electric vehicles while maintaining already developed standards while at the same time simplifying the necessary handling in order to start or terminate the charging process.

The charging arrangement for an electric vehicle having a traction battery has a power supply station, connected to a power network, and a power supply cable having a charging plug, wherein the charging plug is connected to the electric vehicle in order to carry out the charging process. According to the invention, the charging arrangement is wherein in that a voltage converter for converting the supply voltage into a charging voltage which is lower relative thereto is arranged in the charging plug.

A power supply station is also referred to as a charging column in the process. The latter is connected to a power network which has either a central or decentralized pre-distribution. A supply voltage is now applied to this power supply station. According to the invention, this supply voltage is also applied to the charging plug itself. The power supply cable is connected to the power supply station. The supply voltage is significantly higher than the possible charging voltage which the respective electric vehicle can receive. According to the current state of the art, electric vehicles are designed for charging voltages of approximately 400 V or up to 500 V and in exceptional cases of up to 800 V or 850 V. According to the invention, however, the supply voltage may have a higher voltage range, for example, more than 900 V and which may be more than 1000 V.

In order that the supply voltage can now be transmitted to the electric vehicle, a voltage converter is arranged in or on the charging plug. In the case of, in particular, standardized charging plugs, such voltage converters can be retrofitted to the charging plugs. Newly produced charging plugs can already have the voltage converter integrated. The voltage converter has the functions of a power transformer and/or voltage transformer and can be referred to in this way. A higher supply voltage is converted, in particular converted or transformed, to a charging voltage which is lower in relation thereto.

The voltage converter can be a step-down converter in the case of a DC/DC charging process.

The charging arrangement according to the invention thus offers various advantages. On the one hand, a complicated control technique for the charging process in the power supply station itself can be dispensed with. The control or regulation technique for the charging process itself can already be integrated as hardware and software in the voltage converter, so that the electric vehicle communicates with the voltage converter and the latter provides the necessary charging voltage from the supply voltage. At the same time, it is possible to transmit a higher charging power up to the charging plug. A power supply cable, which usually has a length of 1 m to 5 m, in particular 1 m to 3 m, can be significantly reduced in its line cross-section with the same or increased charging power.

In the case of the regulation technique for the charging process in the charging plug itself and/or of an additional wireless communication module in the charging plug, a data line in the power supply cable can be dispensed with. The production costs for a corresponding power supply cable can therefore be reduced due to high copper prices and smaller cross-sections. The handling of a power supply cable according to the invention can be significantly simplified for the individual user, since it has a lower weight compared to charging cables known from the prior art. However, a physical contact of the charging plug and the electric vehicle is always necessary for the purposes of this invention.

The electric vehicle itself can be a hybrid vehicle, in particular a plug-in hybrid vehicle and pure electric vehicle. Both motor vehicles and commercial vehicles can be charged with the charging arrangement according to the invention. It is also conceivable to use the charging arrangement for industrial vehicles and fork-lift trucks. Theoretically, it would also be conceivable to supply aircraft and watercraft with the charging arrangement according to the invention. The handling of the charging arrangement-plug-in process of the charging plug is significantly simplified. The charging power can also be significantly increased, so that the charging time can be shortened while, at the same time, current standards and safety regulations are maintained.

Communication with the motor vehicle may always be carried out during the charging process.

DC charging processes are carried out using the charging arrangement according to the invention. This means that a DC supply voltage is converted by the voltage converter to a DC charging voltage which is lower relative thereto.

At least two, or three, electrical conductors are arranged in the power supply cable itself. Four or five electrical conductors can also be arranged in the power supply cable. Furthermore, at least one communication line can optionally be arranged in the power supply cable. By means of the voltage converter arranged in the charging plug according to the invention, it is possible to reduce the line cross-sections of the electrical conductors, with at least a constant and/or increased charging power available at the charging plug.

Within the scope of the invention, each electrical conductor can may be designed in one piece in cross-section. One piece does not mean a solid or a single piece. A unique conductor can be formed from a plurality of wires which are combined to form a bundle. However, it is also possible to design at least one electrical conductor by means of at least two line strands. For the purposes of the invention, this means that the two line strands are arranged separately from one another in the power supply cable. An electrical conductor can may be formed by more than three line strands, in particular six line strands. However, more than six line strands for an electrical conductor can also be arranged in the power supply cable. A further advantageous embodiment of the invention provides that all the electrical conductors are each formed by at least two separate line strands in the power supply cable. This offers the advantage according to the invention that, in the event of damage, in particular a cable break of a line strand, despite the high charging power to be transmitted, only a small short-circuit current must be protected. In particular, damage caused by overvoltage to the persons operating the charging arrangement is thus avoided. Each individual line strand can thus be protected for a smaller short-circuit current than a relatively large, one-piece electrical conductor.

Furthermore, the at least two line strands or the plurality of line strands may be arranged distributed regularly or irregularly in relation to the cross-section of the power supply cable. This means, in turn, with respect to the distribution in the cross-section, that either all the line strands of an electrical conductor, although separate line strands, are arranged locally together. However, it is also possible for all line strands of all electrical conductors to be arranged distributed irregularly or also regularly to each other. This means, for example, in a sequence that a positive line strand is arranged followed by a negative line strand, followed by a PE protection line strand, followed by a positive line strand, again followed by a negative line strand, etc. However, the line strands can also be arranged in an irregularly distributed manner in the cross-section. The distribution of the conductors on individual line strands and, in turn, a regular or irregular distribution of the line strands of the individual conductors to one another ensure a lower inductance of the power supply cable. A lower voltage drop of the voltage transmitted via the power supply cable is thus achieved.

A further advantageous embodiment variant provides for the power supply cable to be surrounded by a shield. The shield can, on the one hand, shield the fields generated by the power supply cable. On the other hand, however, the shield can also be used to produce a short circuit in the event of a cable break or the like and thus the charging arrangement is switched off for safety reasons.

The voltage converter also requires electrical energy for its operation. A voltage supply for the voltage converter can take place via the power supply cable itself and can thus be tapped off from the supply voltage. However, it is also possible to supply the voltage converter with electrical energy by means of an energy store itself associated with or integrated with this. For this purpose, for example, an accumulator can be used, which is charged in particular when the charging arrangement itself is not in use.

It is thus possible within the scope of the invention to transmit via the power supply cable itself a supply voltage of more than 900 V, in particular more than 1000 V, which may be more than 1200 V, or may be more than 1300 V and or more than 1400 V. A realistic upper limit for the maximum supply voltage to be transmitted should be at most 10,000 V, may be about 5,000 V. Within the scope of the invention, it is conceivable that, in particular, supply voltages of 1000 V to 1600 V, in particular 1300 V to 1550 V and may be 1400 V to 1500 V are transmitted via the power supply cable or are to be provided on the charging plug on the side of the power supply cable.

Furthermore, it is conceivable within the scope of the invention to provide supply voltages of 1800 V to 2500 V, in particular of 1900 V to 2400 V and particularly of approximately 2000 V to 2200 V. These supply voltages are then converted in the voltage converter to a charging voltage which is lower relative thereto.

The charging voltage is provided for a high-voltage battery (traction battery). This means that the charging voltage is between 400 V and 850 V, or may be 400 V or 800 V. Deviations which would be required by an electric vehicle at the beginning or during a charging process are to be included in the above statements.

A ratio of charging voltage to supply voltage of less than 0.9 is particularly preferred. This means that the charging voltage is less than 0.9 times the supply voltage. The charging voltage may be less than 0.85, which may be less than 0.8, or less than 0.75, or may be less than 0.7 and or may be less than 0.6 times the supply voltage. The ratio should, however, be greater than 0.1.

It is thus possible, in the case of current standards and safety regulations as well as available charging technologies on the sides of the electric vehicles, to shorten the charging times with at least constant, in particular increased charging power.

However, no modifications need to be made on the electric vehicles themselves, i.e. on the charging management on the part of the electric vehicle and/or on the energy stores on the part of the electric vehicle.

For the power supply cable, the current-conducting cross-section of each electrical conductor can thus be less than 100 mm$^2$, in particular less than 80 mm$^2$, may be less than 70 mm$^2$ and in particular less than 55 mm$^2$, may be between 20 mm$^2$ and 55 mm$^2$. Here too, at least 10 mm$^2$ should be present as a current-conducting cross-sectional area. Standardized cable cross-sections for the power supply cables can thus be used and in particular cable cross-sections of power supply cables known from the prior art can be reduced. Alternatively, the cable cross-sections need not be increased, but the charging power is significantly increased. The applicable legal regulations and safety regulations are maintained here.

In the following, the table shows the possibility of cross-sectional reduction in the example of a supply voltage of 1500 V transmitted via the power supply cable at predetermined charging powers. A charging voltage of 500 V or 850 V is indicated in each case according to column 3. This corresponds to the charging voltage which is applied to the motor vehicle in the charging plug after the voltage converter. For the first line, this means at a charging power of 50 kW and a charging voltage of 500 V that a charging current of 100 A has to be transmitted. For this purpose, the current-conducting cross-sectional area of each conductor would have to be at least 25 mm$^2$ large. With a supply voltage of 1500 V, it would thus theoretically be possible to reduce the flow-conducting cross-section to 4 mm$^2$. If the charging voltage according to the 2nd line is increased with a charging power of 50 kW to 850 V, then almost 60 A would still have to be transmitted via the power supply cable. According to the prior art, these require a current-conducting cross-section of each conductor of 10 mm$^2$. In this case, too, it would theoretically be possible to reduce the supply voltage to 1500 V of the current-conducting cross-section of each individual conductor to 4 mm$^2$.

However, the difference according to the invention can be recognized, in particular, at higher charging power. A charging current of 300 A would have to be transmitted at 150 kW charging power and a charging voltage of 500 V. According to the safety specification, these 300 A require at least one current-conducting cross-section of 120 mm$^2$ per conductor. If the supply voltage is now reduced to 1500 V, it is possible, with the same charging current, to reduce the current-conducting cross-section of each conductor to 25 mm$^2$, since, with a constant charging power of 150 kW, only 100 A has to be passed through the power supply cable. This results in a reduction of the current-conducting cross-section of each conductor by a factor of 4 to 5. With constant charging power, the power supply cable can thus be at least 4 times lighter, which significantly simplifies the handling and thus the acceptance of the user, with, as stated, a constant charging power, in compliance with the current safety regulations:

| Power | Charging current | Charging voltage | A mm$^2$ Standard | A mm$^2$ U_v 1.500 V |
|---|---|---|---|---|
| 50 kW | 100 A | 500 V | 25 | 4 |
|  | 59 A | 850 V | 10 | 4 |
| 150 kW | 300 A | 500 V | 120 | 25 |
|  | 177 A | 850 V | 50 | 25 |
| 350 kW | 700 A | 500 V | 3 × 120 | 70 |
|  | 412 A | 850 V | 2 × 120 | 70 |

According to the invention, the charging function itself is then regulated via the charging plug or charging plugs. The power supply station itself provides the supply voltage. The charging plug and in particular a control device in the charging plug then communicates with the electric vehicle or the charging management of the electric vehicle. In particular, known wired standards, such as PLC and PWM communication, can be used for this purpose. The supply voltage provided is then converted by the voltage converter in the charging plug to the required or predetermined charging voltage. Thus, the required or predetermined charging voltage can be applied directly to the electric vehicle on the side of the charging plug of the electric vehicle, and the charging current resulting therefrom can be transmitted to the electric vehicle. In particular, this offers the advantage that a further communication line in the power supply cable can be omitted.

Optionally, a wireless communication module can also be arranged in or on the charging plug itself or between the charging plug and the power supply station. Bluetooth or WLAN, for example, can be used as the wireless communication standard. A mobile network standard such as GSM can also be used as the wireless communication standard, so that corresponding data are transmitted. On the one hand, this can be data which is transmitted from the communication module to the power supply station. On the other hand, this can also be data which is transmitted to a server. This data can be, for example, data required by the operator of such power supply stations. However, it is also possible to use data which is transmitted to the automobile manufacturer with respect to charging statuses and charging consumption of the electric vehicles. A further application example is the transmission of data to the driver or owner of the electric vehicle. For example, information about the charging process, the price of the charging process or the charging status of the traction battery can be passed on. This can then be represented in a further development on a corresponding software application (App) of a mobile terminal such as a smartphone. In this case, it is also possible to introduce an invoice in which the price of electricity required for the charging process and the quantity are detected and then calculated via the communication module, by also interconnecting a mobile terminal, for example.

It would also be conceivable that the wireless communication module regulates the voltage converter itself. An additional control hardware for operating the voltage converter would in this case be omitted and taken over by the communication module.

Furthermore, for example, the communication module can monitor the temperature in the charging plug itself and/or on the connection terminals or plug contacts of the charging plug. The charging voltage can then in turn be regulated as a function of the occurring temperatures, so that high temperatures or overheating, in particular at the connection terminals, is avoided.

In a further special embodiment variant of the present invention, an electronic display is provided on the plug surface. This display can in particular be an indicator, for example a crystal indicator, also called LCD indicator or OLED indicator. OLED indicators or other display indicators can also be used. Information about the charging status and the charging process can then be displayed on this display, so that a vehicle driver can read this information using the charging plug during the charging process. For example, it can be indicated that the traction battery is now semi-fully charged, which would interest the driver, and he interrupts the charging process himself at this point in order to continue driving. It is also possible, for example, to display the previous and expected price for the charging process, so that the driver of the electric vehicle is informed.

For the wireless communication module itself, its own power supply would again be necessary. This can be effected either via the supply voltage, or the wireless communication module and the display can also be fed via an energy store in the plug. This may be the same energy store which also supplies the voltage converter. The energy store itself can, for example, be charged when the charging arrangement itself is not in use.

The entire regulation of the charging function is thus carried out in the charging plug itself. The power supply station thus serves only to provide the supply voltage. The production, but also the maintenance costs for operating a charging arrangement according to the invention can thus be significantly reduced, with increased charging power and improved handling of the power supply station.

It is thus also possible to provide a charging management at a charging point for a plurality of electric vehicles. For example, two or more charging plugs can be connected to the power supply station via one voltage supply cable in each case. The individual charging plugs can preferably communicate with one another and adjust a charging power which is optimal/required for each electric vehicle.

The above-mentioned embodiments, in particular for the wireless communication module, also called only communication module in this text, can also be considered separately without departing from the disclosure content. This means that the wireless communication module and the properties and features connected thereto and described can also be used in an unconnected manner by the voltage converter.

The voltage converter can also be operated bi-directionally. This means that the battery voltage of the traction battery can be used to stabilize the network.

The present invention further relates to a method for operating the charging arrangement having the features described at the beginning at least in claim 1. The method is characterized in that a high supply voltage is converted into a charging voltage, which is lower relative thereto, in a voltage converter in the charging plug. A higher charging power is thus provided with the same or reduced cross-section of the power supply cable. At the same time, electric vehicles already on the market can be operated or charged with their respective charging management without further modification with the charging arrangement according to the invention.

For this purpose, the charging plug is plugged into the electric vehicle. The electric vehicle detects the plug-in process and exchanges information with the charging plug by means of PWM communication. For example, the maximum charging current which can be absorbed by the electric vehicle is also transmitted to the charging plug, in particular the communication module in the charging plug. The charging process is then started via the PLC communication. The electric vehicle supplies the charging voltage or the charging current. A set value is specified in the charging plug for the voltage converter. The set value is compared with the actual value and the required charging voltage is adjusted by means of the voltage converter. Likewise, however, the higher supply voltage is converted to the charging voltage, which is lower relative thereto. The entire charging process can thus be carried out by the electric vehicle and the charging electronics of the electric vehicle itself, the communication module and the voltage converter. The power supply station is used only to provide the supply voltage.

The communication module can thus enable communication with the electric vehicle. Furthermore, the communication module can communicate, for example, with the power supply station or with a server. At the same time, however, the communication module can also supply data which is displayed on the charging plug in a display.

In particular, the communication module can communicate with an external receiving point via a wireless connection and exchange data with the charging process/charging status.

BRIEF DESCRIPTION OF THE DRAWINGS

For an understanding of embodiments of the disclosure, reference is now made to the following description taken in conjunction with the accompanying drawings, in which:

FIG. 3(a) is cross section view through charging cable.

FIGS. 3(b) to 3(f) are various cross-sectional views through a power supply cable according to an exemplary embodiment.

FIG. 4 is the charging plug from FIG. 2 with additional wireless communication module and optional displays.

In the figures, the same reference designations are used for identical or similar components, even if a repeated description is omitted for reasons of simplicity.

DETAILED DESCRIPTION OF SOME EMBODIMENTS

Some embodiments will be now described with reference to the Figures.

Figure 1:
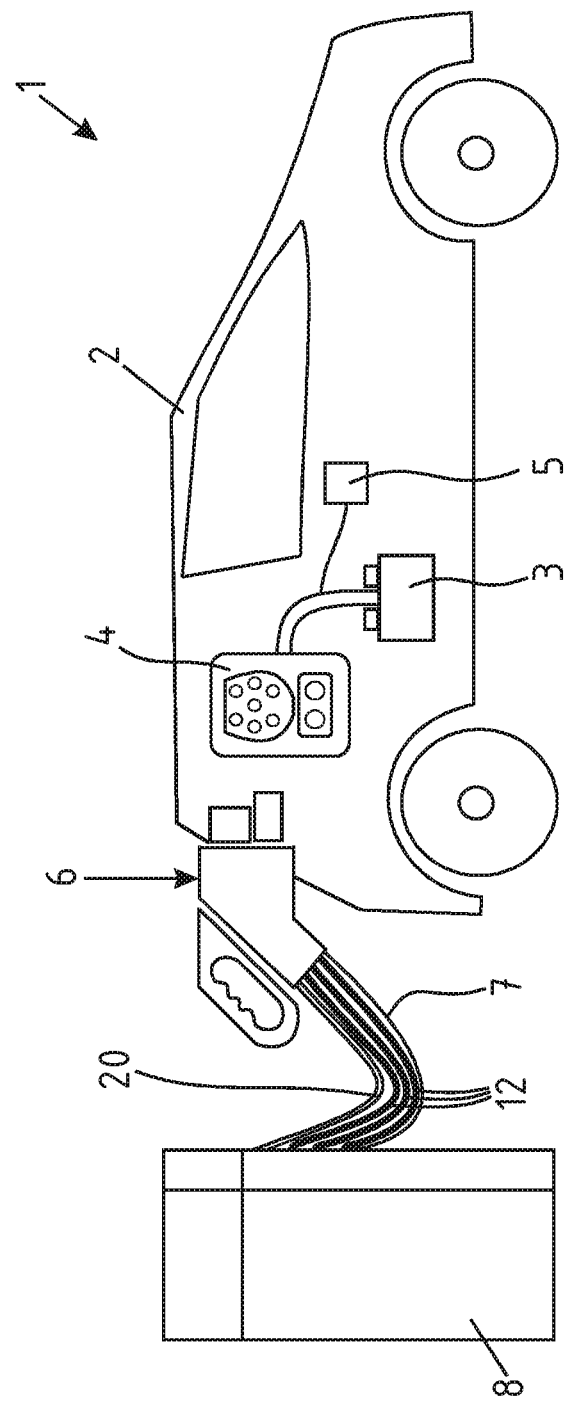
FIG. 1 is a charging arrangement known from the prior art.

FIG. 1 shows a charging arrangement 1 for an electric vehicle 2 known from the prior art. The electric vehicle 2 has a traction battery 3, also called an accumulator or energy store, and a plug socket 4 for plugging in a charging plug 6. Furthermore, the electric vehicle 2 has an onboard charging management 5. In order to carry out a charging process, a charging plug 6 is inserted into the plug socket 4 of the electric vehicle 2. The charging plug 6 is connected to a charging column 8 via a charging cable 7. Both electrical conductors 12 for conducting charging current and communication lines 20 for the communication of charging management 5 of the electric vehicle 2 with the charging column 8 are present in the charging cable 7.

Figure 2:
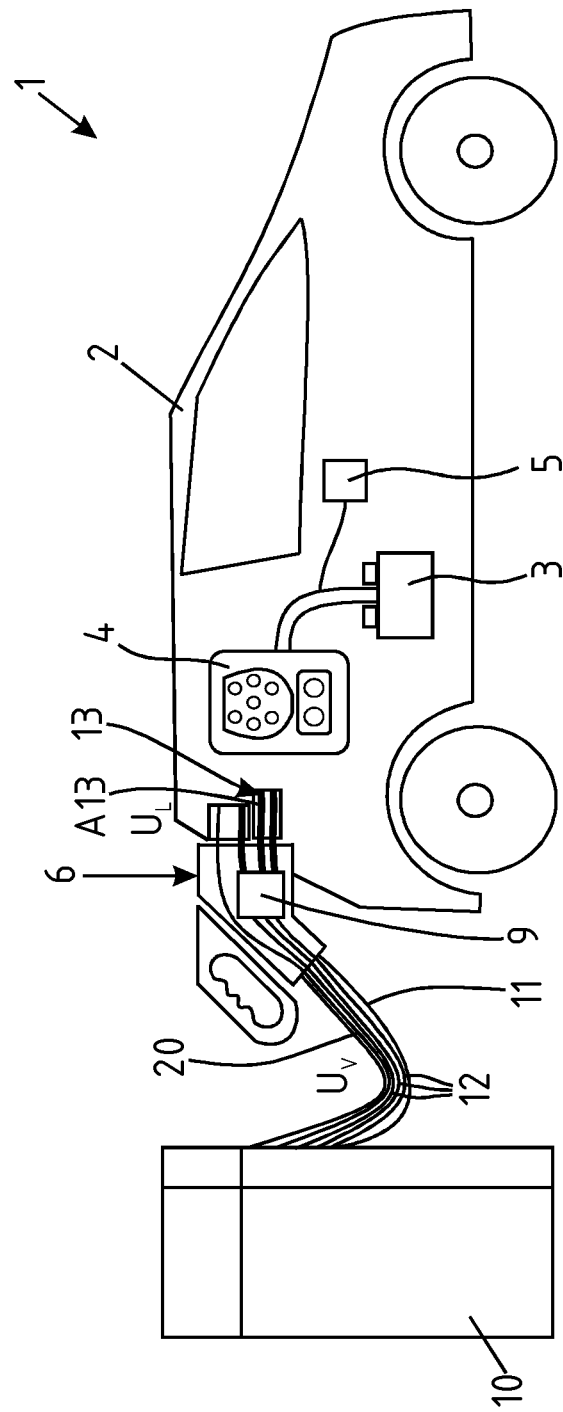
FIG. 2 is a charging arrangement according to an exemplary Embodiment.

FIG. 2 shows a charging arrangement 1 according to the invention. In order to carry out the charging process, the charging plug 6 is inserted into the plug socket 4 of the electric vehicle 2 (not shown for the sake of simplicity). Here too, a charging plug 6 is present. According to the invention, however, a voltage converter 9 is arranged in the charging plug 6 itself. The charging column can thus be referred to as a pure power supply station 10, which provides a supply voltage $U_V$. This supply voltage $U_V$ is passed on to the charging plug 6 via a power supply cable 11, so that at the charging plug 6 the supply voltage $U_V$ is applied to the charging plug 6 on the left-hand side relative to the image plane or is applied to the voltage converter 9. According to the invention, the voltage converter 9 converts the supply voltage $U_V$ to a charging voltage $U_L$ in the charging plug 6, wherein the charging voltage $U_L$ is smaller relative to the supply voltage $U_V$. Thus, it is possible that a cable cross-section of the power supply cable 11 and a line cross-section A12 of the electrical conductors 12 (see also FIG. 3) within the power supply cable 11 is smaller than a line cross-section A13 of the electrical plug contacts 13 and, if appropriate, electrical conductors (not shown in detail) from voltage converter 9 to electrical plug contacts 13 in the charging plug 6. As a result, the weight of the power supply cable 11 associated with it drops, while at the same time simpler handling and the possibility of transmitting a higher charging power via the power supply cable 11 is affected.

FIG. 2 also shows a communication line 20 in the power supply cable 11 as an option of the invention. However, the communication line can be omitted according to the invention, illustrated in FIGS. 3 and 4.

FIG. 3(*a*) shows a cross-sectional view through a charging cable 7 according to the prior art. FIGS. 3(*b*) to 3(*f*) show different cross-sectional views through a respective power supply cable 11 according to the invention. It can be seen that the cross-sectional area A12 of the electrical conductors 12 within the power supply cable 11 is smaller than the cross-sectional area A12 of the electrical conductors 12 within the charging cable 7. The cross-sectional area A11 of the power supply cable 11 shown in FIGS. 3(*b*) to 3(*f*) is also smaller than the cross-sectional area A7 of the left-hand charging cable 7. According to the invention, the communication line 20 can also be omitted.

In FIG. 3(*b*), a shield 22 is optionally shown. The shield 22 is, for example, a sheathing or insulation which, in particular, can itself be formed from an electrically conductive material.

FIG. 3(*c*) furthermore shows an embodiment variant of a power supply cable 11 according to the invention. This in turn has the three electrical conductors 12. These are shown, for example, as 12*a* positive conductors, 12*b* negative conductors and 12*c* PE protective conductors.

Furthermore, an auxiliary voltage line 21 can optionally be provided, via which, for example, an auxiliary voltage can be provided. This auxiliary voltage can be used, for example, in order to supply the voltage converter 9 itself with an operating voltage.

Furthermore, a communication line 20 can optionally be additionally or alternatively provided. The electrical conductors 12*a* to 12*c* are designed as a whole in one piece. This means that they can be formed from a plurality of cores which, however, are combined to form a strand.

In contrast thereto, a respective electrical conductor 12 according to the embodiment variant in FIG. 3 is itself formed from a plurality of individual line strands. The conductor 12*a* is formed, for example, by the line strands 12*a*.1, 12*a*.2, etc. The same applies to the conductor 12*b*. This is formed by the line strands 12*b*.1, 12*b*.2, etc. The same applies in turn to the conductor 12*c*, which is formed from the line strands 12*c*.1, 12*c*.2, etc. A further numbering is omitted for reasons of simplification.

Each conductor 12 may be formed from at least two line strands 12*a*.1, 12*a*.2, etc., in particular from six or more line strands. However, the line strands of each electrical conductor 12 are spatially combined or arranged close to one another in cross-section.

An alternative to this is shown in FIG. 3; here the line strands 12*a*.1 are arranged under the individual electrical conductors 12 in an irregularly distributed manner in the cross-section of the power supply cable 11. In each case optionally, an auxiliary voltage line 22 and a communication line 20 can also be arranged. Individual line views are not shown for reasons of simplicity.

FIG. 3 shows a cross-section of another embodiment of the power supply cable 11 according to the invention. Here again, three conductors 12*a*, 12*b* and 12*c* are shown. The communication line and the auxiliary voltage line are not shown, but can also be omitted. The electrical conductor 12*b* itself is formed by individual line strands 12*b*.1, 12*b*.2, 12*b*.3, etc. These are arranged coaxially around the conductor 12*a*. The conductor 12*a* and the conductor 12*c* are each formed in one piece, that is to say, they are not divided into individual separate line strands. However, this is not conclusive. A second conductor can also be divided into line strands; alternatively, only the conductor 12*c* or only the conductor 12*a* can be divided into individual line strands.

FIG. 4 shows the charging plug 6 according to FIG. 2 in a modified embodiment variant. Here, in addition to the voltage converter 9, a wireless communication module 14 and optionally a display 15 are also integrated in the charging plug 6. In this case, the wireless communication module 14 can communicate with the voltage converter 9. At the same time, the wireless communication module 14 can also include the hardware and software for controlling the voltage converter 9. In addition, an additional energy source 16, for example an accumulator, is shown in FIG. 4. The latter can supply both the voltage converter 9 and the wireless communication module 14 as well as the display 15 with energy. The energy source 16 can, for example, be charged at the power supply station 10 when the charging plug 6 is not in operation. Connection lines of the energy source 16 are not shown.

Figure 5:
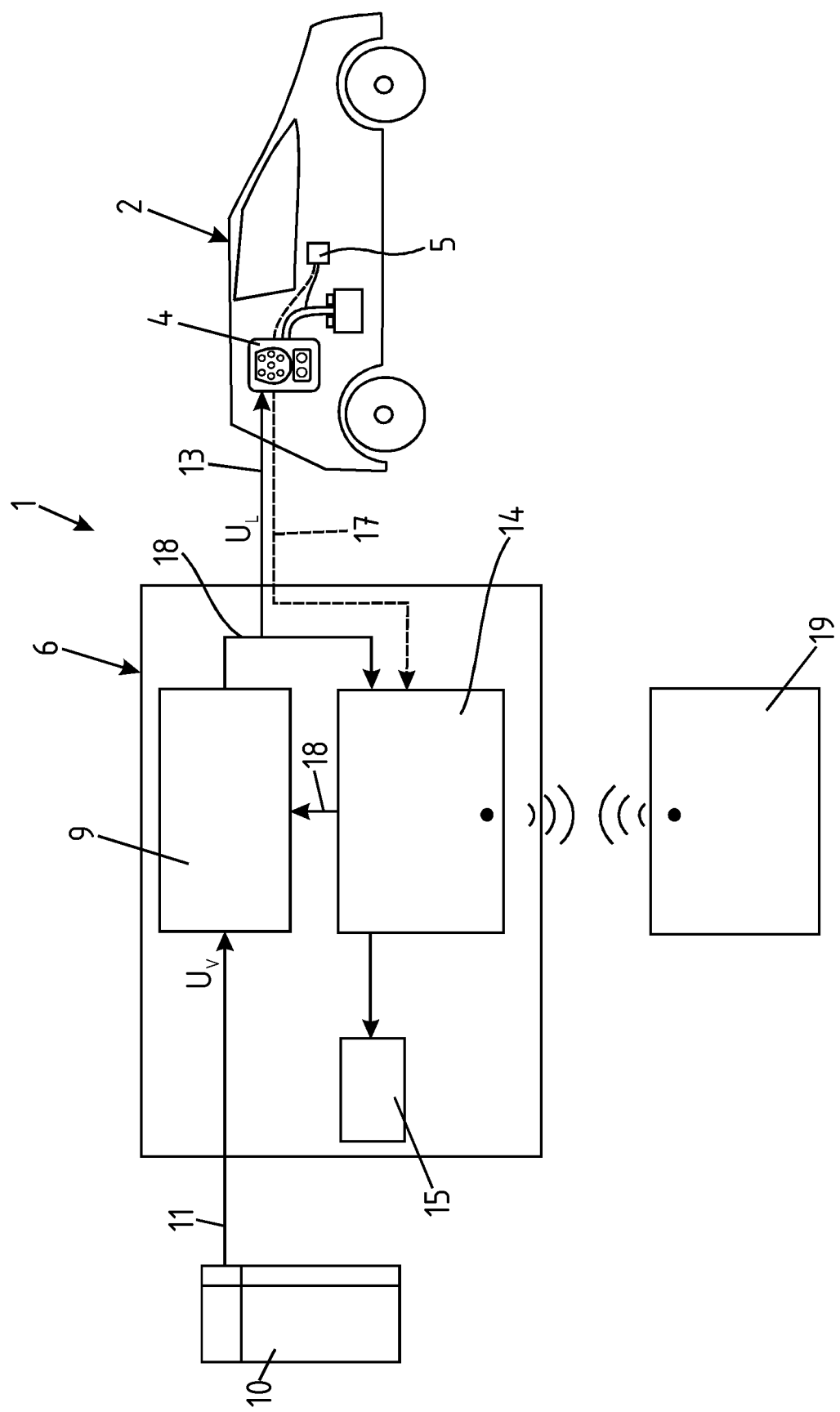
FIG. 5 is a block diagram illustrating a charging process according to an exemplary embodiment.

FIG. 5 also shows a block diagram when carrying out a charging process according to the invention with the charging arrangement 1. The voltage converter 9 according to the invention is arranged in the charging plug 6. When the charging plug 6 is plugged into the plug socket 4 of the electric vehicle 2, the communication with the electric vehicle 2 begins. For this purpose, the wireless communication module 14 is arranged within the charging plug 6. This can both read data 17 of the electric vehicle 2 and carry out a control 18 of the voltage converter 9. In particular, the charging voltage $U_L$ is adjusted. Information can also be reproduced on the display 15 of the charging plug 6. Furthermore, the wireless communication module 14 can communicate with an external receiver 19, in particular a server. This receiver 19 can be arranged, for example, in the power supply station 10. However, it is also possible, for example, via wireless connections, for example a GSM connection, to supply a server which is not location-independent in the vicinity of the vehicle with information. For example, this can be a server to which the user of the electric vehicle 2 has a connection to a mobile terminal. Information can then be transmitted to the mobile terminal with regard to charging duration, electricity price and/or charging status and other relevant data.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A charging arrangement for an electric vehicle having a traction battery, comprising;
a power supply station, connected to a power network and a power supply cable with charging plug, wherein, in order to carry out a charging process, the charging plug is connected to the electric vehicle, wherein a voltage converter is arranged in the charging plug to convert a DC supply voltage (UV) into a DC charging voltage (UL), which is lower than the DC supply voltage (UV).

2. The charging arrangement according to claim 1, wherein at least two electrical conductors are arranged in the power supply cable, and wherein at least one communication line is arranged in the power supply cable.

3. The charging arrangement according to claim 1, wherein a supply voltage (UV) of more than 900 V, is transmitted through the power supply cable.

4. The charging arrangement according to claim 1, wherein the charging voltage (UL) is less than 0.9 times the supply voltage (UV).

5. The charging arrangement according to claim 1, wherein a current-conducting cross-section (A12) of each electrical conductor in the power supply cable is less than 100 mm$^2$.

6. The charging arrangement according to claim 1, wherein the charging process is regulated via the charging plug, wherein a power supply station provides the supply voltage (UV).

7. The charging arrangement according to claim 1, wherein a wireless communication module is arranged in the charging plug between the charging plug and a power supply station.

8. The charging arrangement according to claim 1, wherein the voltage converter and/or a communication module are supplied with energy from the power supply cable and/or in that a separate energy source is provided for this purpose.

9. The charging arrangement according to claim 7, wherein the communication module communicates with a charge management of the electric vehicle, wherein a cable-bound manner, and sends data to and/or receives data from the power supply station and/or a server and/or in that the communication module regulates the charging process.

10. The charging arrangement according to claim 1, wherein the charging plug has a display or indicator, on which information about the charging process, a consumed charging current and/or a charging status of the traction battery are indicated.

11. The charging arrangement according to claim 7, wherein the communication module monitors the temperature of the charging plug, or of the plug contacts of the charging plug.

12. The charging arrangement according to claim 1, wherein a plurality of power supply cables are connected to a power supply station in order to charge a plurality of electric vehicles at the same time, wherein communication modules communicate with one another and adjust each available supply voltage (UV) at the charging plug as charging voltage.

13. The charging arrangement according to claim 1, wherein an electrical conductor in the power supply cable is formed by at least two line strands.

14. The charging arrangement according to claim 13, wherein the line strands are arranged regularly or irregularly in the cross-section of the power supply cable.

15. A method for operating a charging arrangement having the features of claim 1, wherein a supply voltage (UV) is converted into a charging voltage (UL), which is lower than the supply voltage (UV), in a voltage converter in the charging plug.

16. The charging arrangement according to claim 1, wherein a current-conducting cross-section (A12) of each electrical conductor in the power supply cable is less than 80 mm$^2$.

17. The charging arrangement according to claim 1, wherein a current-conducting cross-section (A12) of each electrical conductor in the power supply cable is less than 55 mm$^2$.

18. The charging arrangement according to claim 1, wherein an electrical conductor is formed by six or more line strands in the power supply cable.

19. The charging arrangement according to claim 1, wherein all electrical conductors in the power supply cable are formed by at least two line strands.

* * * * *